(12) United States Patent
Wu et al.

(10) Patent No.: US 11,604,328 B2
(45) Date of Patent: Mar. 14, 2023

(54) LENS DRIVING DEVICE

(71) Applicant: Lanto Electronic Limited, Kunshan (CN)

(72) Inventors: Fuyuan Wu, Kunshan (CN); Yaobang Guo, Kunshan (CN); Shengwen Sun, Kunshan (CN); Bingbing Ma, Kunshan (CN)

(73) Assignee: LANTO ELECTRONIC LIMITED, Kunshan (CN)

( * ) Notice: Subject to any disclaimer, the term of this patent is extended or adjusted under 35 U.S.C. 154(b) by 297 days.

(21) Appl. No.: 17/039,799

(22) Filed: Sep. 30, 2020

(65) Prior Publication Data

US 2021/0356692 A1 Nov. 18, 2021

(30) Foreign Application Priority Data

May 18, 2020 (CN) .......................... 202010416933.4

(51) Int. Cl.
*G02B 7/09* (2021.01)
*G03B 5/02* (2021.01)
*H02K 41/035* (2006.01)

(52) U.S. Cl.
CPC ................. *G02B 7/09* (2013.01); *G03B 5/02* (2013.01); *G03B 2205/0069* (2013.01); *H02K 41/0356* (2013.01)

(58) Field of Classification Search
CPC .......... G02B 7/04; G02B 7/09; G02B 7/1805; G02B 7/182; G02B 13/0075;

(Continued)

(56) References Cited

U.S. PATENT DOCUMENTS

2005/0174657 A1 8/2005 Honsho
2013/0027790 A1 1/2013 Park et al.
(Continued)

FOREIGN PATENT DOCUMENTS

CN 1434439 A 8/2003
CN 102346348 A 2/2012
(Continued)

OTHER PUBLICATIONS

First Office Action for CN Application No. 202010416933.4 dated Jul. 1, 2020.

(Continued)

*Primary Examiner* — Marin Pichler
(74) *Attorney, Agent, or Firm* — Birch, Stewart, Kolasch & Birch, LLP

(57) ABSTRACT

Provided is a lens driving device. The lens driving device includes a housing, a base assembly, and a lens holder. The base assembly forms an accommodation space with the housing, the lens holder is suspended in the accommodation space, and the electromagnetic driving assembly is located at a side of the lens holder and is configured to drive the lens holder to move along a horizontal direction and a vertical direction. The electromagnetic driving assembly includes a magnetic steel structure and a coil structure vertically opposite to the magnetic steel structure, one of the magnetic steel structure and the coil structure is disposed on the housing or the base assembly, and the other one of the magnetic steel structure and the coil structure is disposed on the lens holder.

13 Claims, 16 Drawing Sheets

(58) Field of Classification Search
CPC .............. G02B 26/0816; G02B 26/085; G02B 27/0068; G02B 27/64; G02B 27/646; G02B 5/005; G02B 13/0065; G02B 27/0018; H04N 5/2253; H04N 5/2254; H04N 5/2257; H02H 41/0356; G03B 2205/0015; G03B 2205/0069; G03B 2205/0007; G03B 3/10; G03B 5/00; G03B 5/02; G03B 11/045; G03B 17/02; G03B 13/36
USPC .................................................. 359/824, 825
See application file for complete search history.

(56) References Cited

U.S. PATENT DOCUMENTS

| | | |
|---|---|---|
| 2013/0277907 A1 | 10/2013 | Yamomoto et al. |
| 2016/0054578 A1 | 2/2016 | Dong |
| 2016/0291344 A1 | 10/2016 | Terajima |
| 2018/0017844 A1* | 1/2018 | Yu ........................... G02B 7/08 |
| 2020/0225442 A1* | 7/2020 | Weng .................... G03B 11/045 |
| 2021/0191068 A1* | 6/2021 | Wu ....................... G03B 11/045 |

FOREIGN PATENT DOCUMENTS

| | | |
|---|---|---|
| CN | 204086644 U | 1/2015 |
| CN | 105467718 A | 4/2016 |
| CN | 208888447 U | 5/2019 |
| CN | 110646915 A | 1/2020 |
| CN | 110703538 A | 1/2020 |
| CN | 110764216 A | 2/2020 |
| CN | 210016389 U | 2/2020 |
| TW | 200644386 A | 12/2006 |
| TW | 200804863 A | 1/2008 |

OTHER PUBLICATIONS

First Search Report for CN Application No. 202010416933.4 dated Jun. 18, 2020.
Second Office Action for CN Application No. 202010416933.4 dated Jul. 17, 2020.

* cited by examiner

LENS DRIVING DEVICE

CROSS-REFERENCE TO RELATED APPLICATION

This application claims priority to a Chinese Patent Application No. 202010416933.4 filed May 18, 2020, the disclosure of which is incorporated herein by reference in its entirety.

TECHNICAL FIELD

The present disclosure relates to the field of camera techniques for electronic products and, in particular, to a lens driving device.

BACKGROUND

At present, an electronic device (such as a mobile phone) is usually provided with a camera module, so that the electronic device has functions of camera, video and the like, and is convenient for a user to use.

The camera module includes a lens, a driving device, a sensor for imaging, an integrated circuit board, and the like. The driving device is used for fixing the lens or controlling a motion of the lens. Exemplarily, the driving device is capable of driving the lens to move along one or more directions to assist the lens in focusing.

In the related art, the driving device includes at least a base, a housing, a lens holder, and four driving assemblies located in a cavity surrounded by the base and the housing. Two of the four driving assemblies are located below the lens holder and are used for driving the lens holder to move along a vertical direction, and the other two of the four driving assemblies are located above the lens holder and are used for driving the lens holder to move along a horizontal direction, so as to assist the lens in focusing.

Since each driving assembly includes at least a coil and a magnetic steel, and the coil in each drive assembly is connected to a circuit board on the base, the driving device in the related art needs to install more components in an assembly process, an installation process is more complicated, and the assembly efficiency of the camera module is lower.

SUMMARY

The object of the present disclosure is to provide a lens driving device, which reduces the number of magnetic steel structures and coil structures, simplifies an installation process of the lens driving device, and enables higher assembly efficiency of the lens driving device.

As conceived as above, the present disclosure provides the technical solutions described below.

A lens driving device includes a housing, a base assembly, a lens holder and an electromagnetic driving assembly.

The base assembly forms an accommodation space with the housing.

The lens holder is suspended in the accommodation space.

The electromagnetic driving assembly is located at a side of the lens holder and is configured to drive the lens holder to move along a horizontal direction and a vertical direction, where the electromagnetic driving assembly includes a magnetic steel structure and a coil structure vertically opposite to the magnetic steel structure, one of the magnetic steel structure and the coil structure is disposed on the housing or the base assembly, and the other one of the magnetic steel structure and the coil structure is disposed on the lens holder.

The magnetic steel structure includes a first driving part and a second driving part sequentially arranged along a first direction, the first driving part is configured to drive the lens holder to move along the first direction, and the second driving part is configured to drive the lens holder to move along a second direction, and the second direction is perpendicular to the first direction.

Optionally, the lens driving device includes two electromagnetic driving assemblies, and the two electromagnetic driving assemblies are arranged at an interval in the horizontal direction and are located at the same side of the lens holder.

Optionally, the first driving part includes one first driving unit or a plurality of first driving units sequentially arranged along the second direction, where the one first driving unit or each of the plurality of first driving units includes a first magnetic pole and a second magnetic pole sequentially arranged along the second direction, and a magnetic polarity of the first magnetic pole is opposite to a magnetic polarity of the second magnetic pole.

In response to the one first driving unit, the coil structure includes a first coil corresponding to the one first driving unit, or in response to the plurality of first driving units, the coil structure includes a plurality of first coils in one-to-one correspondence with the plurality of first driving units.

Optionally, the second driving part includes one second driving unit or a plurality of second driving units sequentially arranged along the first direction, where the one second driving unit or each second driving unit includes a third magnetic pole and a fourth magnetic pole sequentially arranged along the first direction, and a magnetic polarity of the third magnetic pole is opposite to a magnetic polarity of the fourth magnetic pole.

In response to the one second driving unit, the coil structures includes a second coil corresponding to the one second driving unit, or in response to the plurality of second driving units, the coil structure includes a plurality of second coils in one-to-one correspondence with the plurality of second driving units.

Optionally, when the second driving part includes the one second driving unit, the third magnetic pole in the one second driving unit is disposed adjacent to the first driving part, and the third magnetic pole is an S pole.

Optionally, when the second driving part includes two second driving units, the coil structure includes two second coils in one-to-one correspondence with the two second driving units.

A third magnetic pole in the one of the two second driving units is disposed adjacent to the first driving part and is an S pole; and a third magnetic pole in the other one of the two second driving units is disposed adjacent to a fourth magnetic pole in the one of the two second driving units and is an S pole; or a third magnetic pole in one of the two second driving units is disposed adjacent to the first driving part and is an N pole; and a third magnetic pole in the other one of the two second driving units is disposed adjacent to a fourth magnetic pole in the one of the two second driving units and is an S pole.

Optionally, there are two electromagnetic driving assemblies, and an arrangement direction of the first driving part and the second driving part of the magnetic steel structure of one of the two electromagnetic driving assemblies is opposite to an arrangement direction of the first driving part and the second driving part of the magnetic steel structure of the other one of the two electromagnetic driving assemblies.

Optionally, the first driving part and the second driving part are an integrated magnetizing structure.

Optionally, the lens driving device further includes a suspension wire disposed on the base assembly, where the suspension wire supports the lens holder to be suspended in the accommodation space, and when the electromagnetic driving assembly drives the lens holder to move along the horizontal direction, the suspension wire is capable of assisting the electromagnetic driving assembly to drive the lens holder to move along the vertical direction.

Optionally, the lens driving device further includes a spring, where the spring is fixedly connected to the suspension wire and the lens holder.

Optionally, a bottom side of the lens holder is provided with an accommodation groove, the electromagnetic driving assembly is located at the bottom side of the lens holder, and the magnetic steel structure of the electromagnetic driving assembly is embedded in the accommodation groove.

Figure 1:
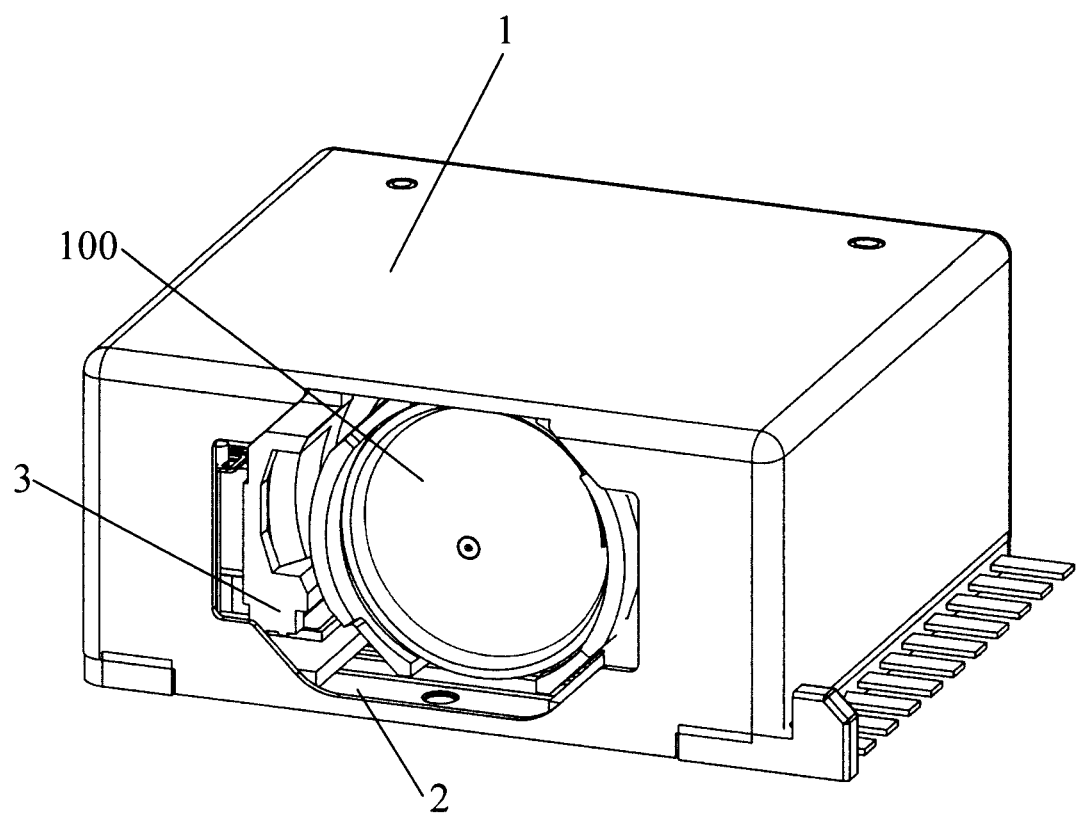
FIG. 1 is a structure view of a lens driving device according to an embodiment of the present disclosure.

REFERENCE LIST 1 housing
2 base assembly
21 base
22 conductive terminal
221 power source connection tail
3 lens holder
31 groove
32 accommodation groove
4 electromagnetic driving assembly
41 first driving part
411 first driving unit
4111 first pole
4112 second pole
42 second driving part
421 second driving unit
4211 third magnetic pole
4212 fourth magnetic pole
43 coil structure
431 first coil
432 second coil
5 suspension wire
6 support structure
7 spring
8 magnet yoke
9 integrated circuit (IC)
10 Hall-effect detector
100 lens

DETAILED DESCRIPTION

To make solved problems, adopted solutions and achieved effects of the present disclosure clearer, the solution of the present disclosure is further described in conjunction with accompanying drawings and an embodiment. It is to be understood that the specific embodiments set forth below are intended to illustrate and not to limit the present disclosure. For ease of description, only a part, not all, related to the present disclosure is illustrated in the accompanying drawings.

In the description of the present disclosure, it should be understood that the orientational or positional relationships indicated by terms "center", "above", "below", "left", "right", "vertical", "horizontal", "inside", "outside" and the like are based on the orientational or positional relationships illustrated in the drawings, which are for the mere purpose of facilitating and simplifying the description of the present disclosure, and these relationships do not indicate or imply that the device or component referred to has a specific orientation and is constructed and operated in a specific orientation, and thus it is not to be construed as limiting the present disclosure. Moreover, terms like "first" and "second" are merely used for the description and are not to be construed as indicating or implying relative importance.

In the description of the present disclosure, it should be noted that unless otherwise expressly specified and limited, terms like "mounted", "connected to each other", "connected" are to be construed in a broad sense, for example, as permanently connected, detachably connected; mechanically connected or electrically connected; directly connected or indirectly connected via an intermediate medium; or internally connected between two elements. For those skilled in the art, the preceding terms can be construed depending on specific contexts.

A lens driving device is provided in an embodiment and has a fewer number of components, a simple installation process, and is convenient to assemble.

As shown in FIGS. 1 to 18, the lens driving device includes a housing 1, a base assembly 2, a lens holder 3 and an electromagnetic driving assembly 4.

The housing 1 and the base assembly 2 can form an accommodation space, the lens holder 3 is suspended in the accommodation space, and the lens holder 3 is used for holding a lens 100.

The electromagnetic driving assembly 4 is located at a side of the lens holder 3, specifically, may be located at an upper side or a lower side of the lens holder 3. The electromagnetic driving assembly 4 is configured to drive the lens holder 3 together with the lens 100 to move along a horizontal direction and a vertical direction, that is, the electromagnetic driving assembly 4 is capable of driving the lens holder 3 to move along the horizontal direction and also of driving the lens holder 3 to move along the vertical direction to assist the lens 100 in focusing. Further, the electromagnetic driving assembly 4 includes a magnetic steel structure and a coil structure 43 vertically opposite to the magnetic steel structure. The coil structure 43 is electrically connected to the base assembly 2, so that the base assembly 2 can supply current to the coil structure 43, thereby enabling the coil structure 43 to generate a magnetic field, and the magnetic field interacts with the magnetic steel structure to generate an electromagnetic force to drive the lens holder 3 to move.

Figure 2:
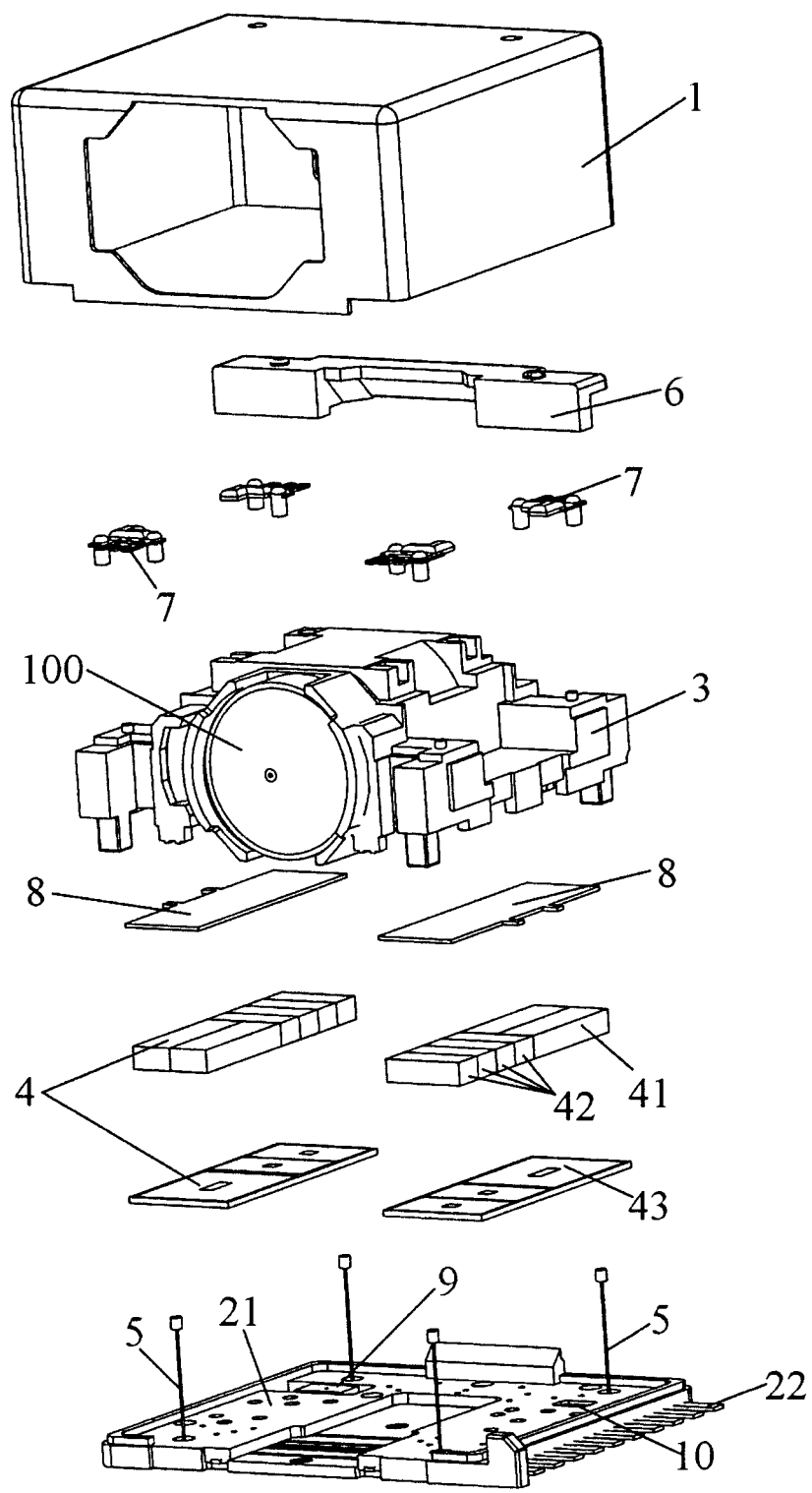
FIG. 2 is an exploded structure view of the lens driving device according to the embodiment of the present disclosure.

One of the magnetic steel structure and the coil structure 43 is disposed on the housing 1 or the base assembly 2, and the other one of the magnetic steel structure and the coil structure 43 is located on the lens holder 3. Exemplarily, as shown in FIG. 2, the magnetic steel structure is located on the lens holder 3, and the coil structure 43 is located on the base assembly 2; or the magnetic steel structure may be located on the base assembly 2, and the coil structure 43 is located on the lens holder 3; or the magnetic steel structure is located on the lens holder 3, and the coil structure 43 is located on the housing 1; or the magnetic steel structure is located on the housing 1, and the coil structure 43 is located on the lens holder 3.

The lens driving device provided in the embodiment can drive the lens 100 to move in the accommodation space only through the electromagnetic driving assembly located at one side of the lens holder 3, that is, the lens driving device in the embodiment may include fewer magnetic steel structures and fewer coil structures 43, such as one magnetic steel structure and one coil structure, and compared with the related art, the number of magnetic steel structures and the number of coil structures 43 are reduced, the installation process of the lens driving device is simpler, and the assembly efficiency of the lens driving device can be higher.

Since the one side of the lens holder 3 is provided with the electromagnetic driving assembly 4 and the other side of the lens holder 3 is not provided with any electromagnetic driving assembly 4, it is not necessary to open a mold on the other side of the lens holder 3, thus reducing the mold opening cost and the like of the lens driving device. In addition, there are fewer dispensing points, and the installation engineering stations for the magnetic steel structure and the coil structure 43, thus reducing the cost of the lens driving device.

Optionally, the lens driving device may include one or more electromagnetic driving assemblies 4. In a case where the lens driving device includes one electromagnetic driving assembly 4, the one electromagnetic driving assembly 4 is located at the upper side or the lower side of the lens holder 3. In a case where the lens driving device includes a plurality of electromagnetic driving assemblies 4, the plurality of electromagnetic driving assemblies 4 are arranged at intervals in the horizontal direction and are located at the same side of the lens holder 3. The horizontal direction may be a front-rear direction of the lens holder 3 or a left-right direction of the lens holder 3. Exemplarily, as shown in FIG. 2, the lens driving device includes two electromagnetic driving assemblies 4, and the two electromagnetic driving assemblies 4 are arranged at an interval in the left-right direction and are located at the lower side of the lens holder 3.

In the embodiment, the front-rear direction of the lens holder 3 is named as a first direction L, the left-right direction of the lens holder 3 is named as a second direction K, and the first direction L and the second direction K are the horizontal direction and perpendicular to each other.

Figure 3:
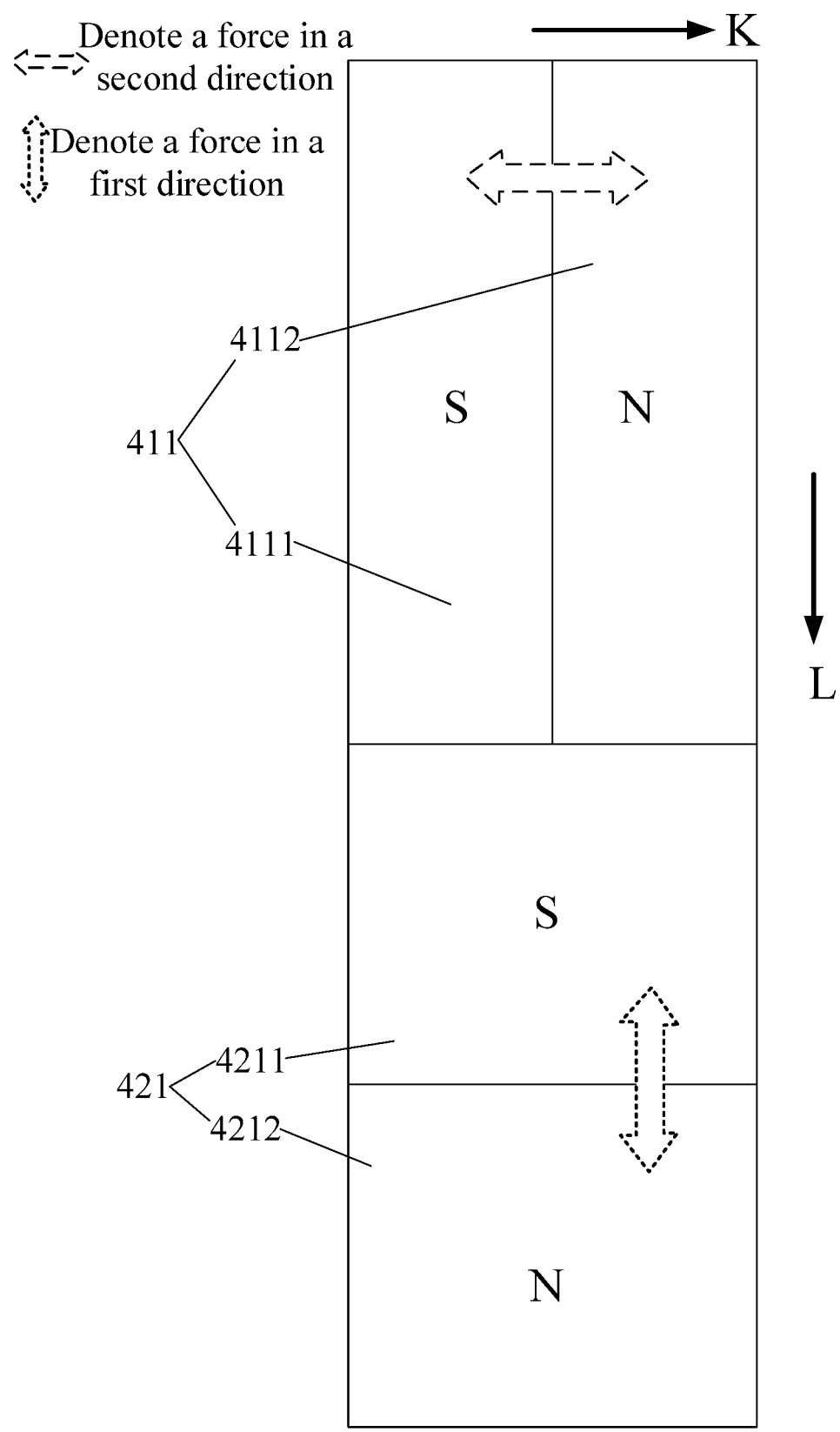
FIG. 3 is a schematic view of a magnetic steel structure according to the embodiment of the present disclosure.

As shown in FIGS. 2 and 3, each magnetic steel structure includes a first driving part 41 and a second driving part 42 sequentially arranged along the first direction L. The first driving part 41 is used for driving the lens holder 3 to move along the second direction K, and the second driving part 42 is used for driving the lens holder 3 to move along the first direction L. The first driving part 41 and the second driving part 42 are provided so that the lens holder 3 can be driven to move in the horizontal direction. It is to be noted that the magnetic steel structure may be elongated, and an extension direction (i.e., a longitudinal direction) of the magnetic steel structure is parallel to the first direction L.

Further, as shown in FIGS. 3 to 6, the first driving part 41 may include one or more first driving units 411, each first driving unit 411 includes a first magnetic pole 4111 and a second magnetic pole 4112 sequentially arranged along the second direction K, and a magnetic polarity of the first magnetic pole 4111 is opposite to a magnetic polarity of the second magnetic pole 4112. In a case where the first magnetic pole 4111 is an S pole, the second magnetic pole 4112 is an N pole; and in a case where the first magnetic pole 4111 is an N pole, the second magnetic pole 4112 is an S pole.

Figure 7:
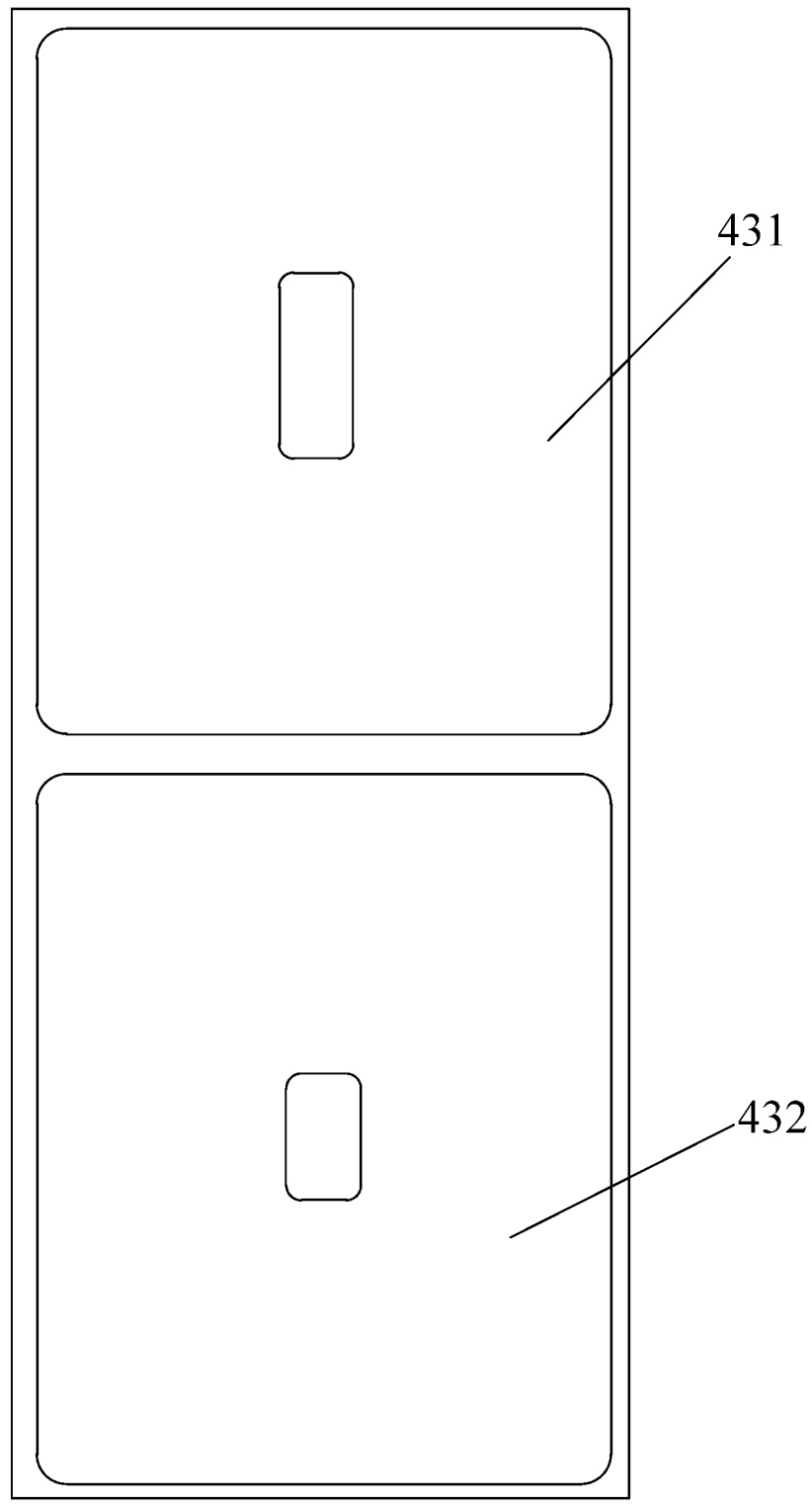
FIG. 7 is a schematic view of a coil structure according to the embodiment of the present disclosure.
Figure 8:
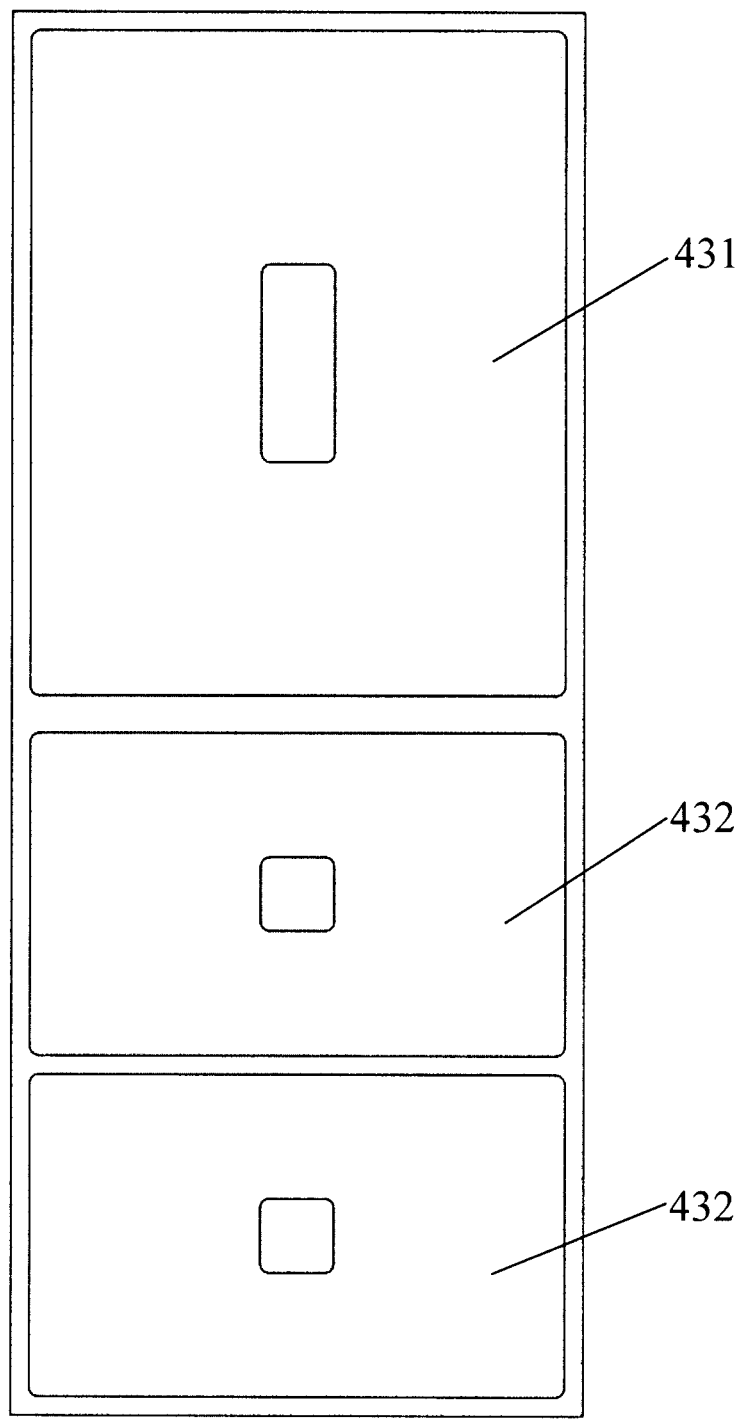
FIG. 8 is a schematic view of another coil structure according to the embodiment of the present disclosure.
Figure 9:
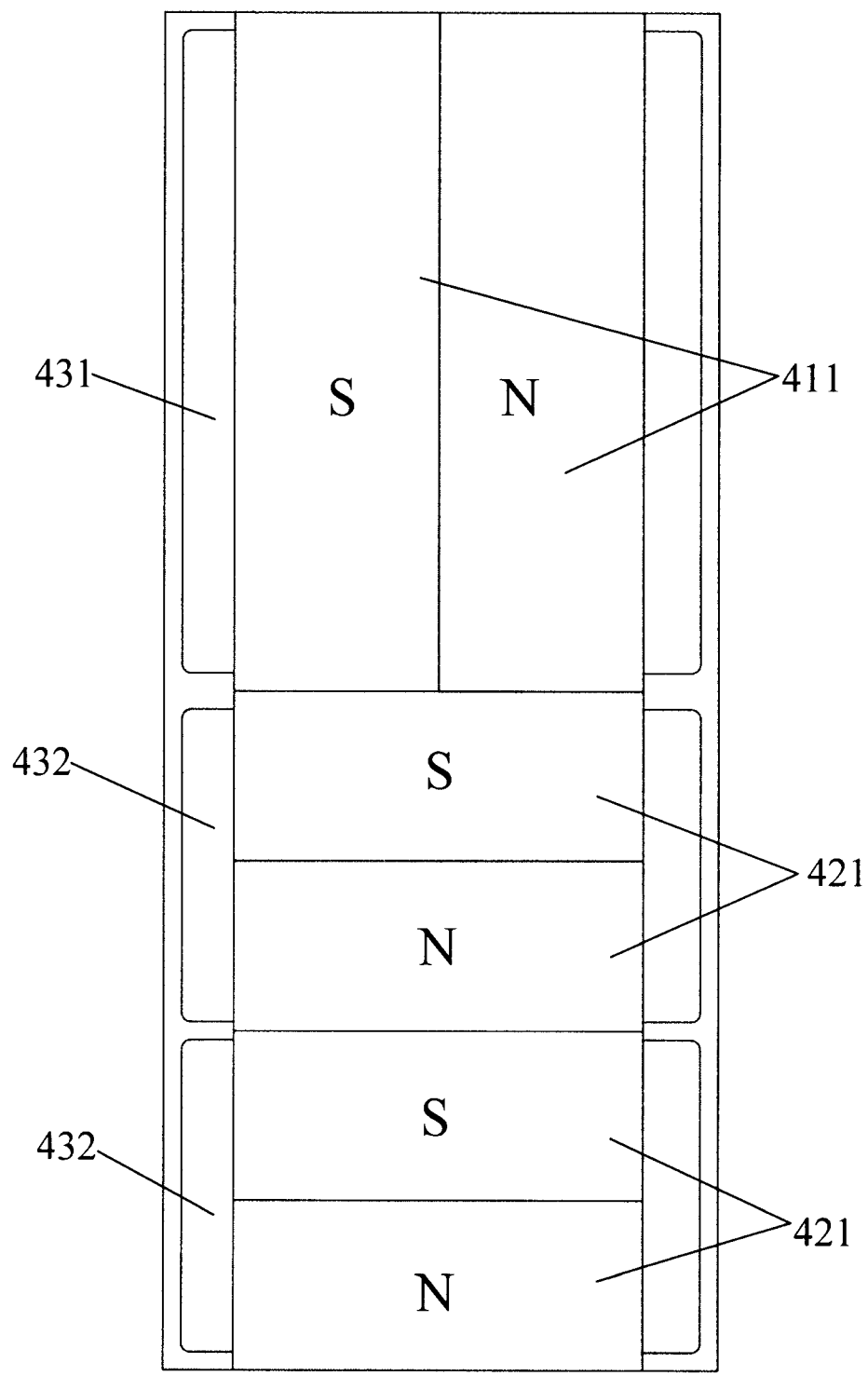
FIG. 9 is an assembly view of the magnetic steel structure and the coil structure according to the embodiment of the present disclosure.

In a case where the first driving part 41 includes one first driving unit 411, as shown in FIGS. 7 and 8, the coil structure 43 includes one first coil 431, and the one first coil 431 is disposed corresponding to the one first driving units 411. Exemplarily, the first coil 431 may be located directly below the first driving unit 411.

In a case where the first driving part 41 includes a plurality of first driving units 411, the plurality of first driving units 411 are sequentially arranged along the second direction K. The coil structure 43 includes a plurality of first coils 431, and each of the plurality of first coils 431 corresponds to a respective one of the plurality of first driving units 411. Exemplarily, each first coil 431 is located directly below one of the plurality of first driving units 411 corresponding to the each first coil 431.

In an embodiment, a shape of the first coil 431 may be the same as a shape of the first driving unit 411 corresponding to the first coil 431, so that the first coil 431 can interact with the first driving unit 411 corresponding to the first coil 431. A size of a contour profile of the first coil 431 may be the same as or similar to a size of a contour profile of the first driving unit 411 corresponding to the first coil 431, so that the first coil 431 can reduce the influence of the first coil 431 on other structures while the first coil 431 fully interacts with the corresponding first driving unit 411. The first coil 431 shown in FIG. 7 or 8 may correspond to the first driving unit 411 shown in FIG. 3, 4 or 5.

As shown in FIG. 3, the interaction between the first coil 431 and the first driving unit 411 can generate an electromagnetic force in the second direction K to push the lens holder 3 to move along the second direction K. Optionally, the electromagnetic force in the second direction K can be used for optical anti-shake of the lens 100.

Optionally, still referring to FIGS. 3 to 6, the second driving part 42 includes one or more second driving units 421, each second driving unit 421 includes a third magnetic pole 4211 and a fourth magnetic pole 4212 sequentially arranged along the first direction L, and a magnetic polarity of the third magnetic pole 4211 is opposite to a magnetic polarity of the fourth magnetic pole 4212. In a case where the third magnetic pole 4211 is S pole, the fourth magnetic pole 4212 is N pole; and in a case where the third magnetic pole 4211 is N pole, the fourth magnetic pole 4212 is S pole.

In a case where the second driving part 42 includes one second driving units 421, as shown in FIG. 7 the coil structure 43 includes one second coil 432, and the second coil 432 is disposed corresponding to the one second driving units 421. Exemplarily, the second coil 432 may be disposed directly below the second driving unit 421.

In a case where the second driving part 42 includes a plurality of second driving units 421, and the plurality of second driving units 421 are sequentially arranged along the first direction L. The coil structure 43 includes a plurality of second coils 432, and each of the plurality of second coils 431 corresponds to a respective one of the plurality of second driving units 421. Exemplarily, the second coil 432 is disposed directly below the second driving units 421 corresponding to the second coil 432.

In an embodiment, a shape of the second coils 432 may be the same as a shape of the second driving unit 421 corresponding to the second coil 432, so that the second coils 432 can interact with the second driving units 421 corresponding to the second coil 432. A size of a contour profile of the second coil 432 may be the same as or similar to a size of a contour profile of the second driving unit 421 corresponding to the second coil 432, so that the second coil 432 can reduce the influence of the second coil 432 on other structures while the second coil 432 fully interacts with corresponding second driving unit 421. The second coil 432 shown in FIG. 7 corresponds to the second driving unit 421 shown in FIG. 3, and each of two second coils 432 shown in FIG. 8 corresponds to a respective one of the two second driving units 421 shown in FIG. 4, 5 or 6.

Figure 4:
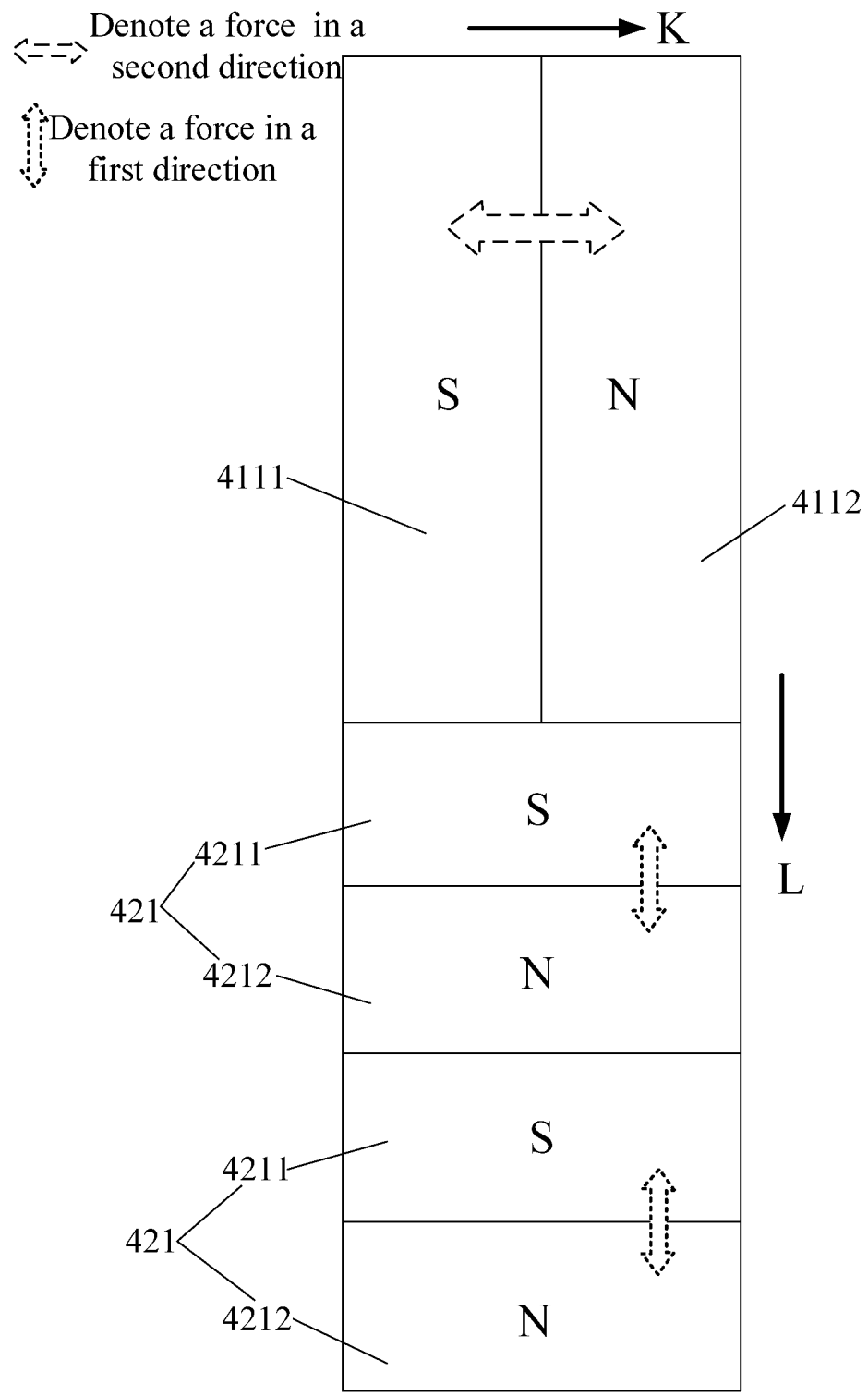
FIG. 4 is a schematic view of another magnetic steel structure according to the embodiment of the present disclosure.

As shown in FIG. 4, the interaction between the two second coils 432 and the two second driving units 421 can generate the electromagnetic force in the first direction L to push the lens holder 3 to move along the first direction L to assist the lens 100 in focusing. In this case, the first direction L may also be referred to as a focusing direction.

Optionally, according to different numbers of included first driving units 411, the first driving part 41 may have a plurality of structures, and the following three structures are given by way of example in the embodiment.

Figure 5:
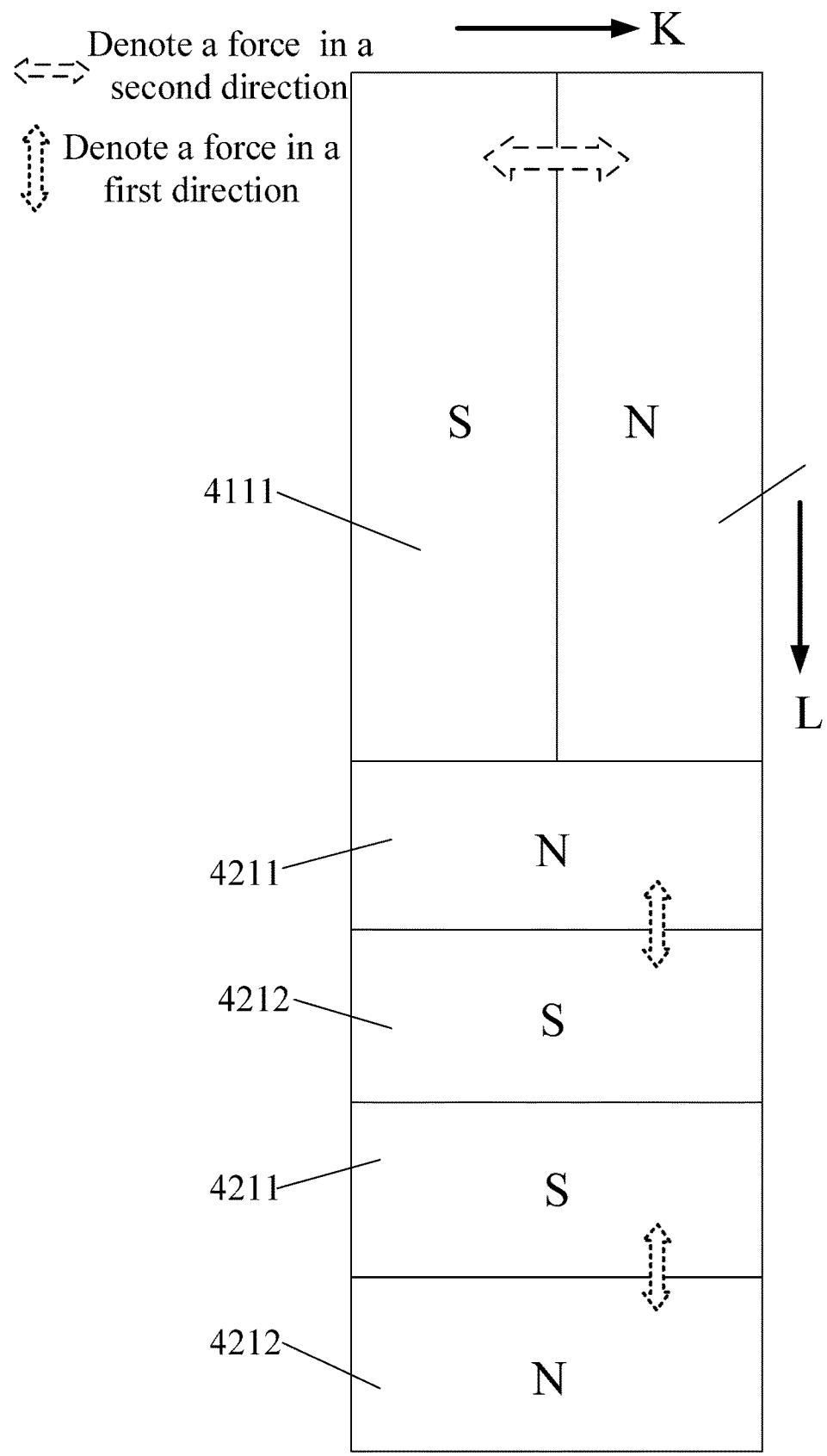
FIG. 5 is a schematic view of yet another magnetic steel structure according to the embodiment of the present disclosure.

In a structure of the first driving part 41, as shown in FIGS. 3 to 5, the first driving part 41 includes one first driving unit 411. The first magnetic pole 4111 and the second magnetic pole 4112 in the one first driving unit 411 are S pole and N pole, respectively.

Figure 6:
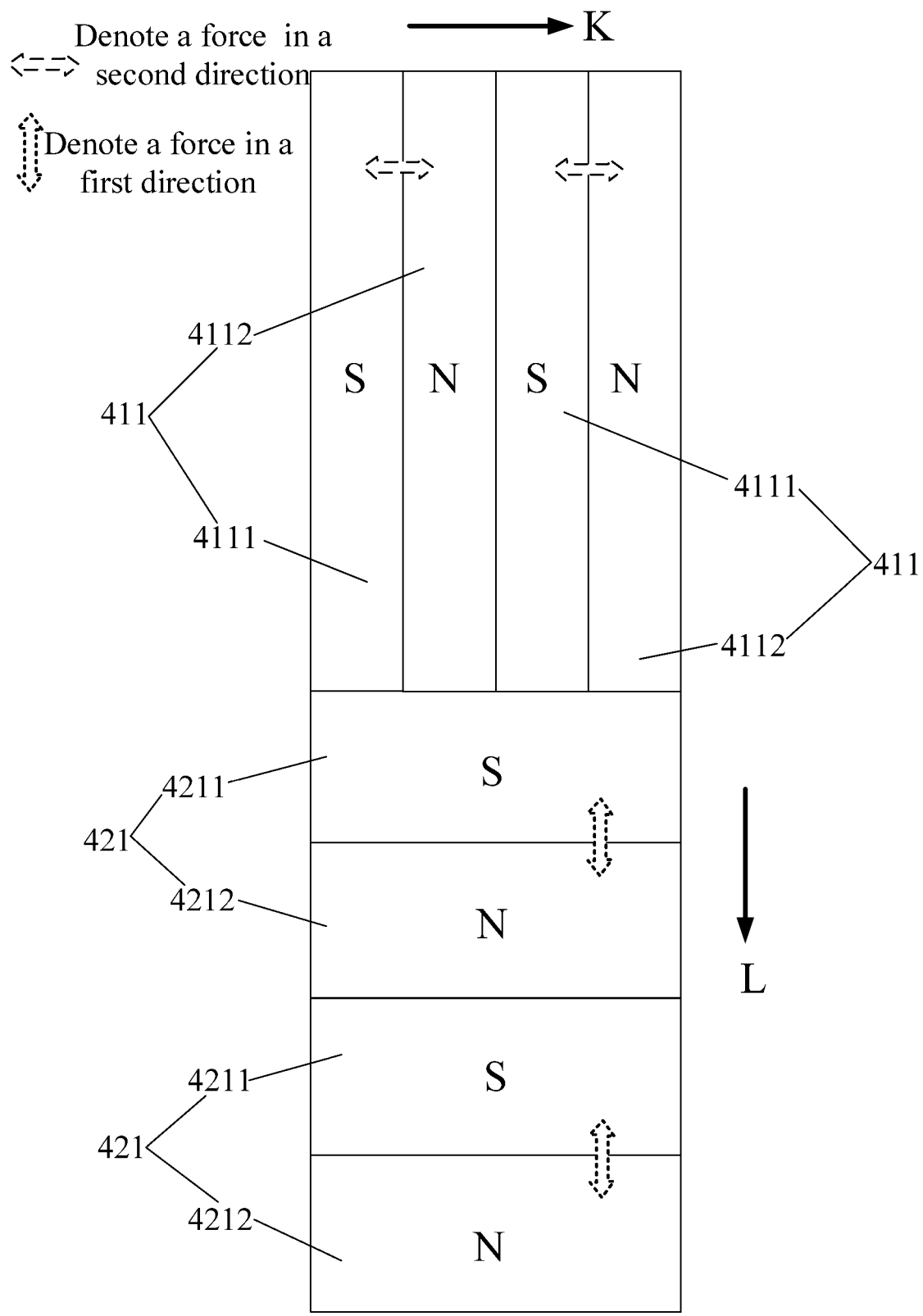
FIG. 6 is a schematic view of yet another magnetic steel structure according to the embodiment of the present disclosure.

In another structure of the first driving part 41, as shown in FIG. 6, the first driving part 41 includes two first driving units 411. A first magnetic pole 4111 and a second magnetic pole 4112 in each of the two first driving units 411 are S pole and N pole, respectively, and from left to right, a first magnetic pole 4111 in one of the two first driving units 411, a second magnetic pole 4112 in the one of the two first driving units 411, a first magnetic pole 4111 in the other one of the two first driving units 411, and a second magnetic pole 4112 in the other one of the two first driving units 411 are arranged in sequence.

In an another structure of the first driving part 41, the first driving part 41 includes the two first driving units 411. A first magnetic pole 4111 in one of the two first driving units 411 is S pole, and a first magnetic pole 4111 in the other one of the two first driving units 411 is N pole. In addition, the first magnetic pole 4111 in the one of the two first driving units 411, a second magnetic pole 4112 in the one of the two first driving units 411, the first magnetic pole 4111 in the other one of the two first driving units 411, and a second magnetic pole 4112 in the other one of the two first driving units 411 are sequentially arranged along the second direction K.

Optionally, according to different numbers of included second driving units 421 is different, the second driving part 42 may have a plurality of structures, and the following three structures are given by way of example in the embodiment.

In a structure of the second driving part 42, as shown in FIG. 3, the second driving part 42 includes one second driving unit 421. In the one second driving unit 421, a third magnetic pole 4211 is disposed adjacent to the first driving part 41 and is S pole, and a fourth magnetic pole 4212 is N pole.

In another structure of the second driving part 42, as shown in FIG. 4 or 6, the second driving part 42 includes two second driving units 421. In this case, the coil structure 43 includes two second coils 432 in one-to-one correspondence with the two second driving units 421. A third magnetic pole 4211 in one of the two second driving units 421 is disposed adjacent to the first driving part 41 and is S pole, and a fourth magnetic pole 4212 in the one of the two second driving units 421 is N pole. A third magnetic pole 4211 in the other one of the two second driving units 421 is disposed adjacent to the fourth magnetic pole 4212 in the one of the two second driving units 421 and is S pole, and a fourth magnetic pole 4212 in the other one of the two second driving units 421 is N pole.

In yet another structure of the second driving part 42, as shown in FIG. 5, the second driving part 42 includes two second driving units 421. In this case, the coil structure 43 includes two second coils 432 in one-to-one correspondence with the two second driving units 421. A third magnetic pole 4211 in one of the two second driving units 421 is disposed adjacent to the first driving part 41 and is N pole, and a fourth magnetic pole 4212 in the one of the two second driving units 421 is S pole. A third magnetic pole 4211 in the other one of the two second driving units 421 is disposed adjacent to the fourth magnetic pole 4212 in the one of the two second driving units 421 and is S pole, and a the fourth magnetic pole 4212 in the other one of the two second driving units 421 is N pole.

It is to be noted that the three structures of the above-mentioned first driving part 41 and the three structures of the second driving part 42 can be arbitrarily combined to obtain magnetic steel structures having different first driving parts 41 and second driving parts 42, and the embodiment will not be described herein.

Optionally, a size of the first driving part 41 in the first direction L may be the same as a size of the second driving part 42 in the first direction L, and a size of the first driving part 41 in the second direction K may be the same as a size of the second driving part 42 in the second direction K, so that a first pushing force generated by the first driving part 41 and the first coil 431 can be close in magnitude to a focusing pushing force generated by the second driving part 42 and the second coil 432, and the electromagnetic driving assembly 4 can stably drive the lens holder 3 to move.

Figure 10:
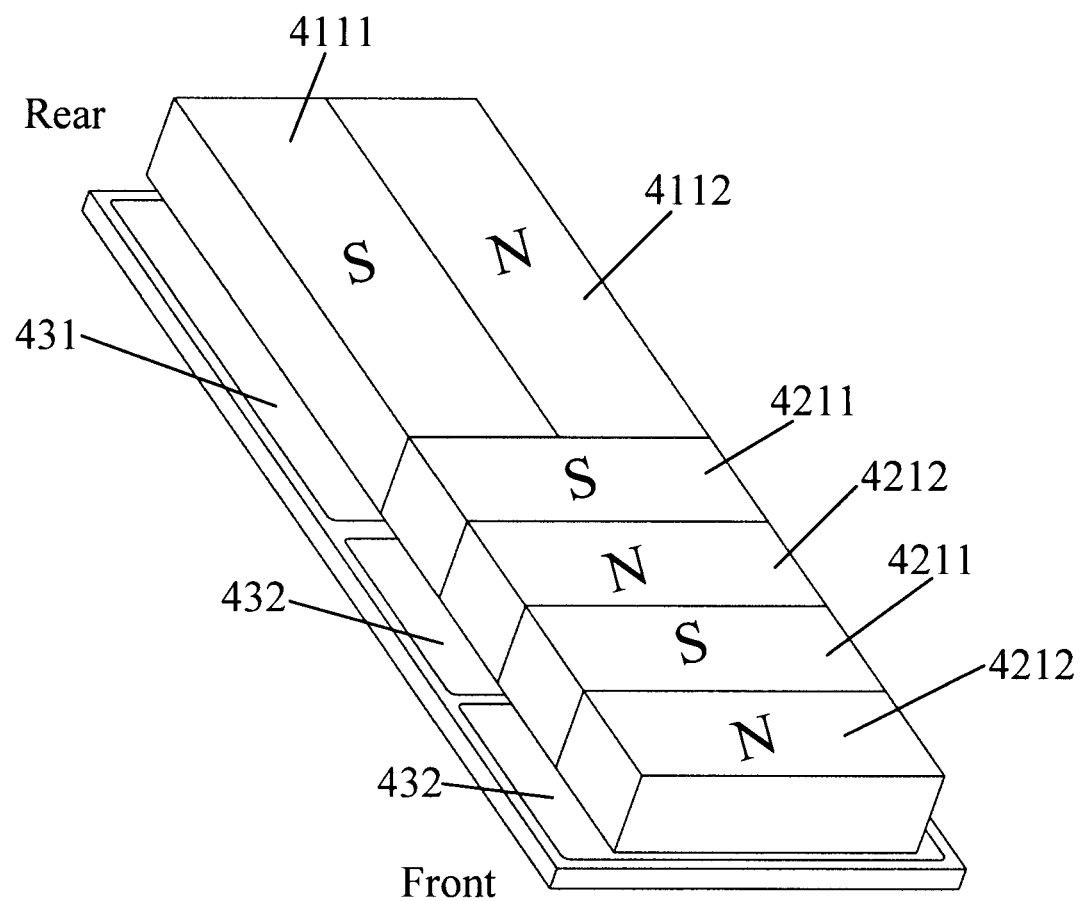
FIG. 10 is a structure view of an electromagnetic driving assembly according to the embodiment of the present disclosure.
Figure 11:
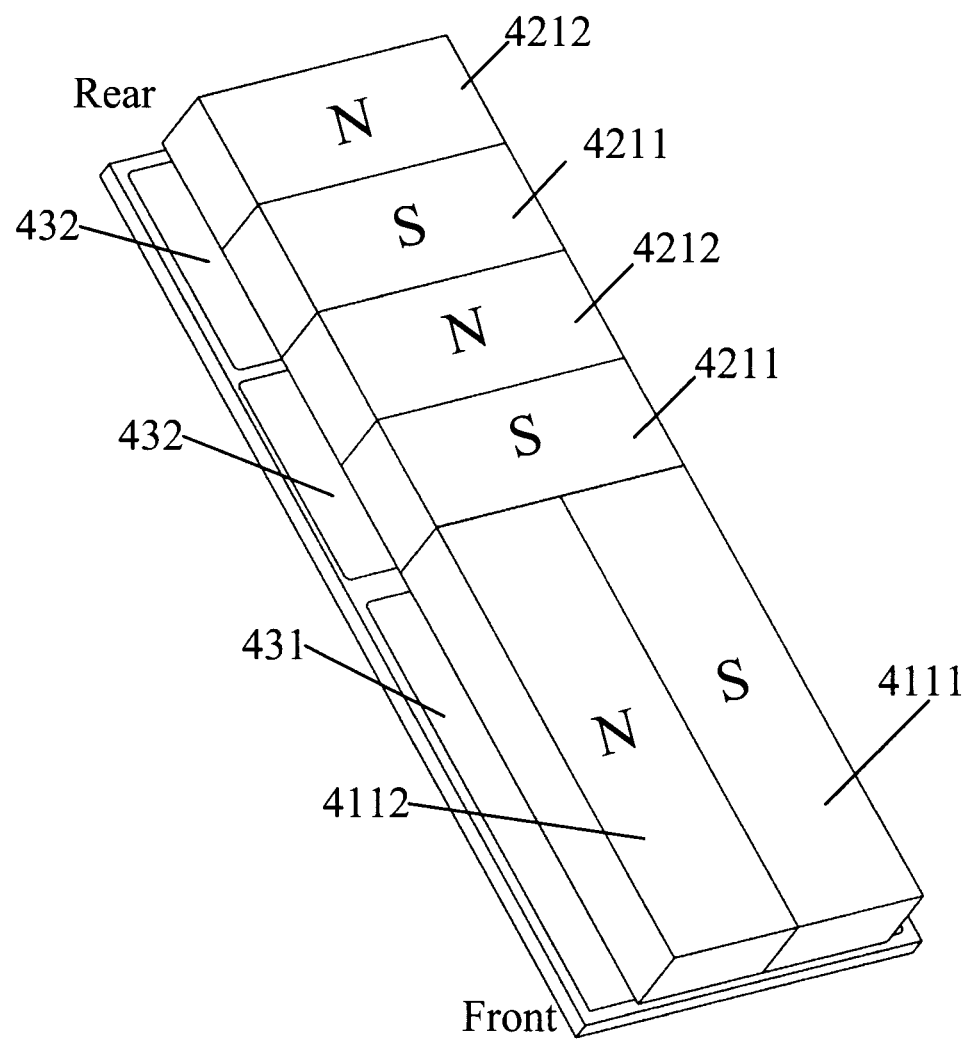
FIG. 11 is a structure view of another electromagnetic driving assembly according to the embodiment of the present disclosure.

In the embodiment, FIG. 10 is a structure view of an electromagnetic driving assembly according to the embodiment of the present disclosure and FIG. 11 is a structure view of another electromagnetic driving assembly according to the embodiment of the present disclosure. As can be seen in FIGS. 10 and 11, an arrangement direction of the first driving part 41 and the second driving part 42 of one magnetic steel structure is opposite to an arrangement direction of the first driving part 41 and the second driving part 42 of another magnetic steel structure. Specifically, the first driving part 41 and the second driving part 42 in the magnetic steel structure shown in FIG. 10 are sequentially arranged from rear to front, and the first driving part 41 and the second driving part 42 in the magnetic steel structure shown in FIG. 11 are sequentially arranged from front to rear. Briefly, the two magnetic steels are the same in shape and structure, but their arrangement directions in the lens driving device are different.

Optionally, the first coil 431 and/or the second coil 432 are a flexible printed circuit board (FPCB) coil, that is, at least one of the first coil 431 or the second coil 432 is an FPCB coil.

The FPCB coil is a patterned printed circuit board made of a flexible substrate, which is mainly composed of an insulating substrate and a conductive layer (e.g., a copper foil layer), and adhesive can be provided between the insulating substrate and the conductive layer. Since the PCB itself is multi-layered and is a structure formed by superimposing copper foils and the insulating layers, and the copper foils can be etched into any shape, the PCB can be etched into a shape of a coil, two adjacent layers of copper foils are conducted through vias, and the multi-layers of copper foils are accumulated and conducted through the vias, so that the PCB can be used as the coil, that is, the FPCB coil in the embodiment is formed. The FPCB coil is formed by pressing the copper foil and the flexible plate, so that the thickness of the FPCB coil can be smaller than the thickness of the enameled wire coil, thereby reducing the volume occupied by the FPCB coil, and reducing the volume of the lens driving device.

Optionally, the magnetic steel structure in the embodiment may be a single piece of magnetic steel, or may also be formed by a combination of a plurality of pieces of magnetic steels. That is, the first driving part 41 and the second driving part 42 in the magnetic steel structure of the present embodiment are an integrated magnetizing structure, and when forming the magnetic steel structure, it is only necessary to perform different magnetization on different positions of the magnetic steel structure according to requirements. Alternatively, the first driving part 41 and the second driving part 42 may be structures independently of each other.

Further, in a case where the first driving part 41 has a plurality of first driving units 411, the plurality of first driving units 411 may be an integrated structure or a separated structure. In a case where the second driving part 42 has a plurality of second driving units 421, the plurality of second drive units 421 may be an integrated structure or a separated structure.

Further, the first magnetic pole 4111 and the second magnetic pole 4112 in each first driving unit 411 may be an integrated structure or a separated structure, and in a case where the first magnetic pole 4111 and the second magnetic pole 4112 in the first driving unit 411 is a separated structure, it is convenient for magnetizing. The third magnetic pole 4211 and the fourth magnetic pole 4212 in each second driving unit 421 may be an integrated structure or a separated structure, and in a case where the third magnetic pole 4211 and the fourth magnetic pole 4212 in the second driving unit 421 is a separated structure, it is convenient for magnetizing.

In the embodiment, as shown in FIG. 2, two electromagnetic driving assemblies 4 are both located at a lower side of the lens holder 4, that is, the two electromagnetic driving assemblies 4 are located between the lens holder 3 and the base assembly 2.

Figure 12:
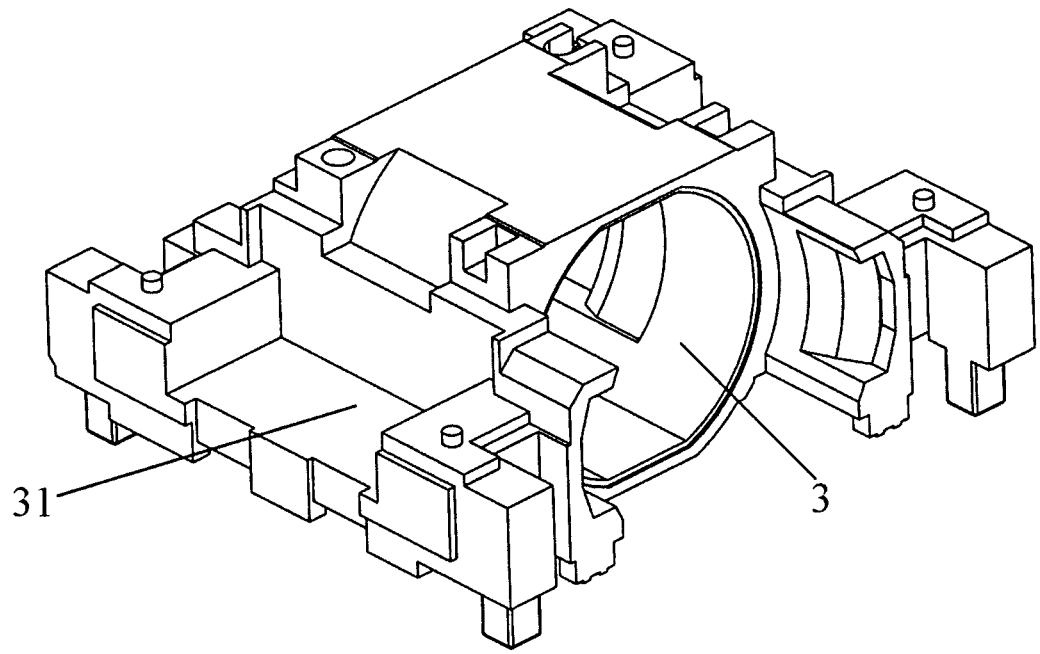
FIG. 12 is a structure view 1 of a lens holder according to the embodiment of the present disclosure.
Figure 13:
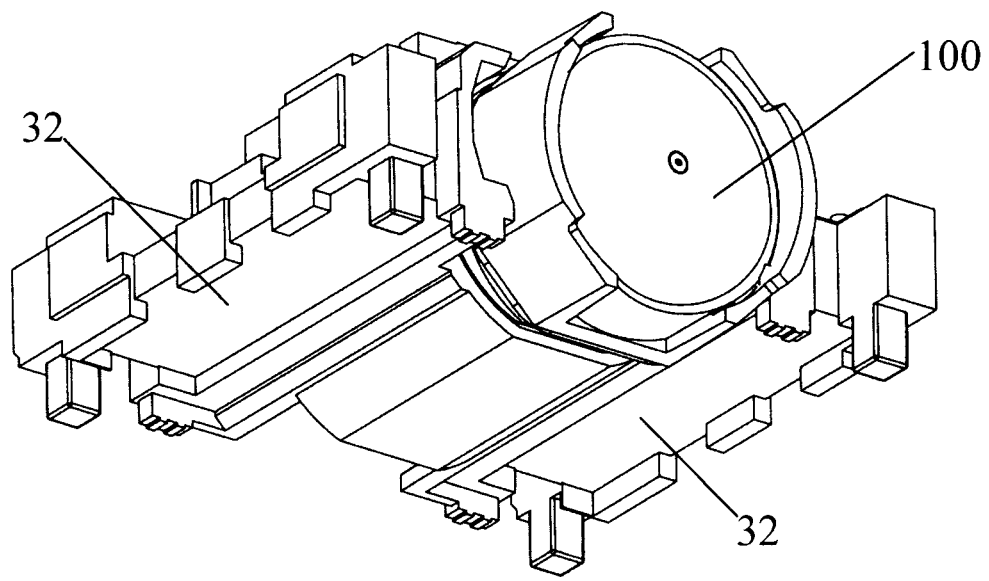
FIG. 13 is a structure view 2 of the lens holder according to the embodiment of the present disclosure.
Figure 14:
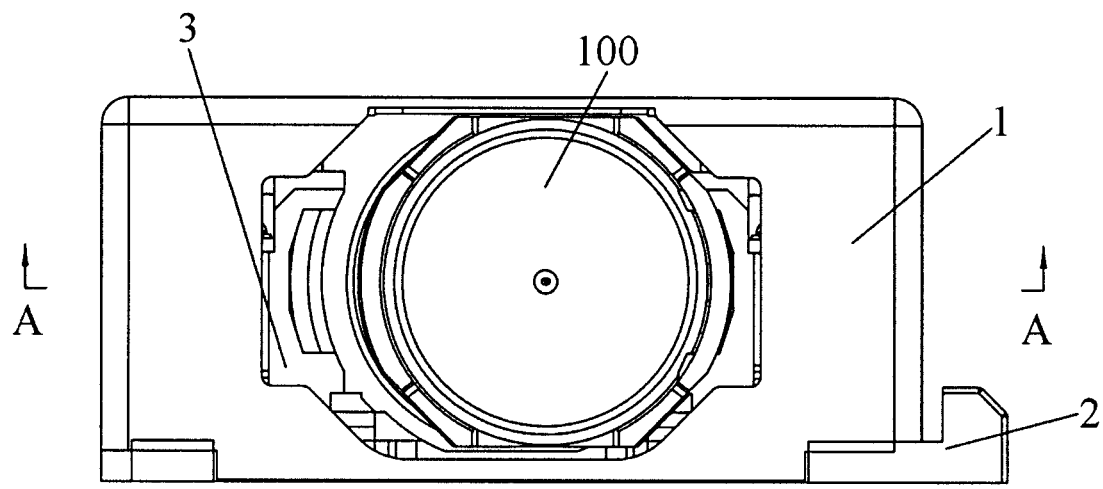
FIG. 14 is a front view of the lens driving device according to the embodiment of the present disclosure.
Figure 15:
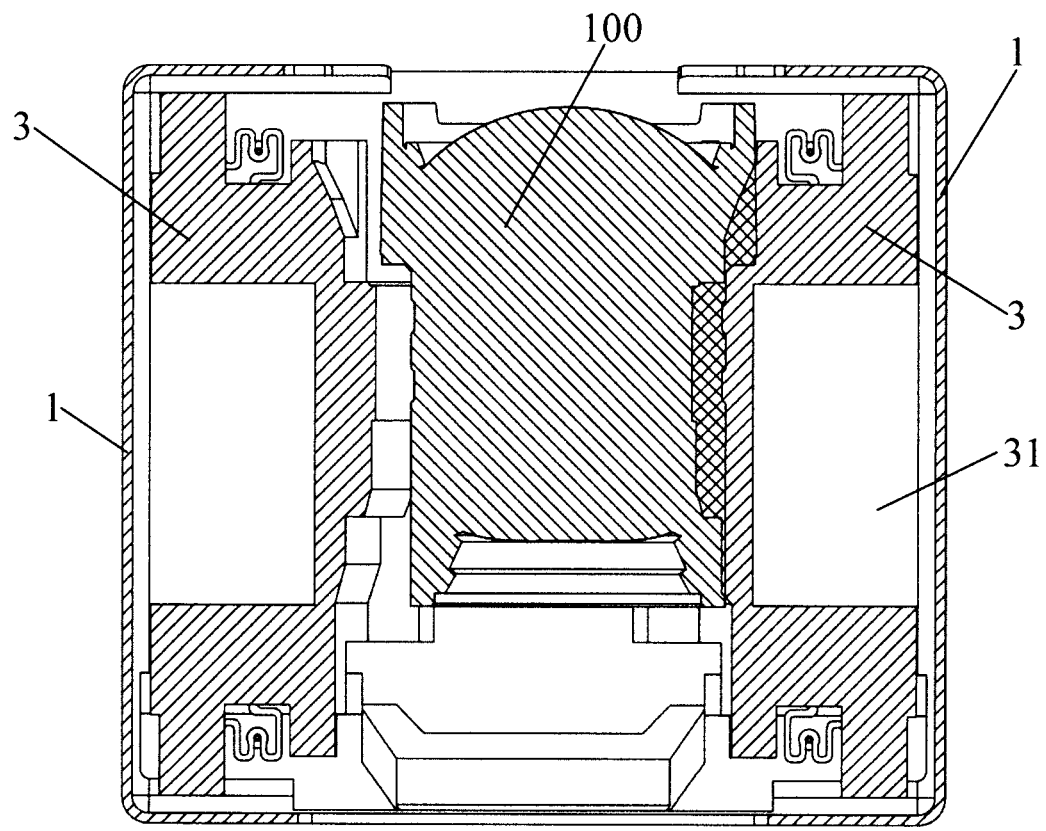
FIG. 15 is a cross-sectional view taken along a line A-A of the lens driving device shown in FIG. 14 according to the embodiment of the present disclosure.

Optionally, as shown in FIGS. 12 and 13, in a case where the electromagnetic driving assemblies 4 are omitted from an upper side of the lens holder 3, the upper side of the lens holder 3 may be provided with a groove 31 to reduce the weight of the lens holder 3 and further reduce the weight of the lens driving device, so that the lens driving device can be applied to electronic equipment with high weight requirements.

Further, a lower side of the lens holder 3 is provided with two accommodation grooves 32, and two magnetic steel structures in two electromagnetic driving assemblies 4 are secured in the two accommodation grooves 32, respectively, so that the magnetic steel structures are convenient for driving the lens holder 3 to move.

Optionally, as shown in FIGS. 2 and 14 to 18, the base assembly 2 includes a base 21 and a plurality of conductive terminals 22. The base 21 and the plurality of conductive terminals 22 are injection molded into an integrated structure, so that the base assembly 2 can have a smaller thickness, the utilization rate of the base 21 is improved, the probability of separation of the plurality of conductive terminals 22 from the base 21 can be reduced, and the reliability of connection between the base 21 and the plurality of conductive terminals 22 is ensured.

Figure 16:
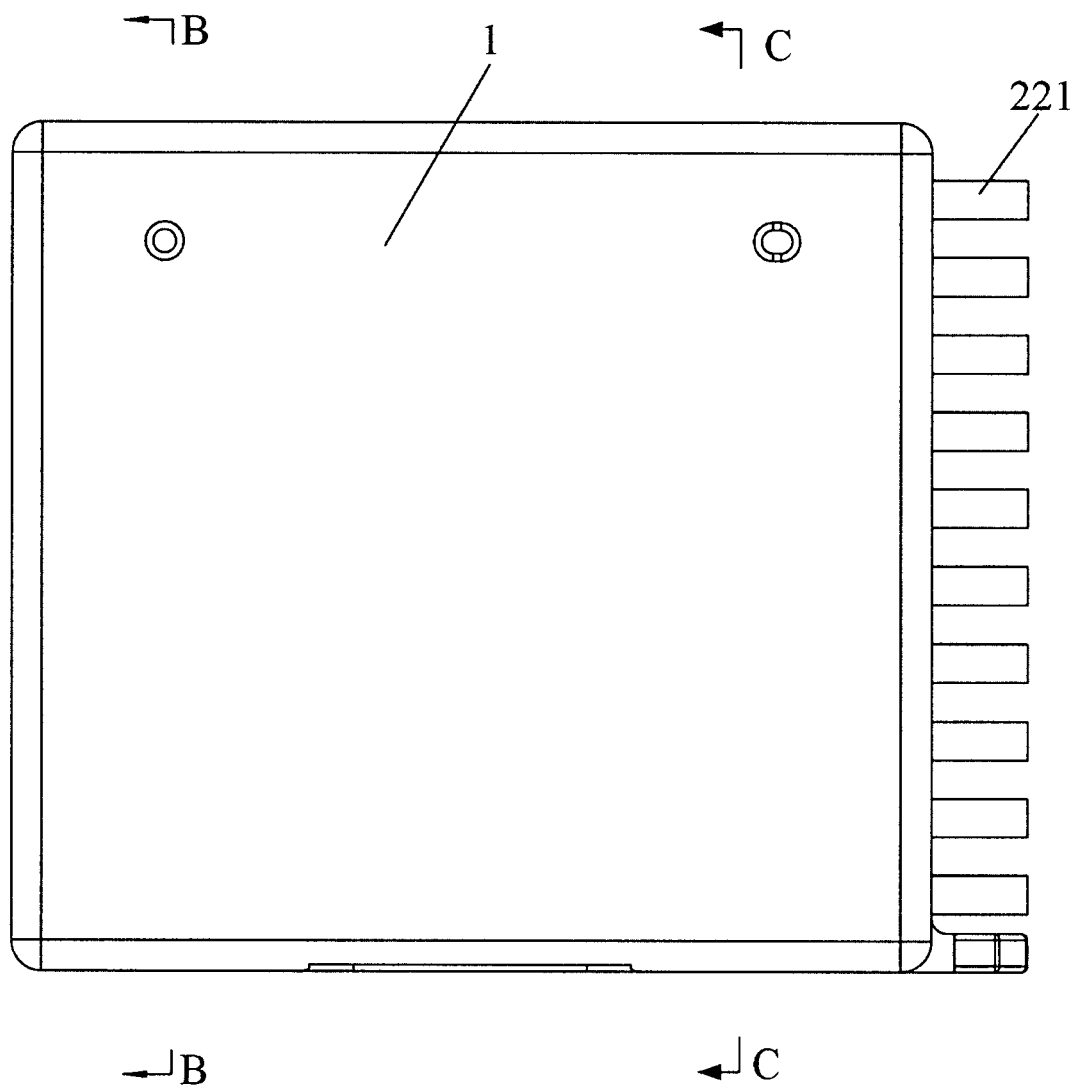
FIG. 16 is a top view of the lens driving device according to the embodiment of the present disclosure.

As shown in FIG. 16, each conductive terminal 22 has a power source connection tail 221 protruding from the base 21. The power source connection tail 221 is electrically connected to an external power source so as to be able to supply electric energy to structures, such as the first coil 431 and the second coil 432, in the lens driving device.

Optionally, the base 21 is provided with a first groove and a second groove respectively disposed corresponding to the two electromagnetic driving assemblies 4. Among the plurality of conductive terminals 22, there are a conductive terminal that can be exposed to a bottom of the first groove and a conductive terminal that can be exposed to a bottom of the second groove.

As shown in FIG. 2, the lens driving device further includes an integrated circuit (IC) 9 located on the first groove and electrically contacted with the conductive terminal at the bottom of the first groove, and a Hall-effect detector 10 located on the second groove and electrically contacted with the conductive terminal 22 at the bottom of the second groove. The Hall-effect detector 10 can detect changes of magnetic field of the magnetic steel structure in the each electromagnetic driving assembly 4 so as to determine a position of the magnetic steel structure. In a case where the magnetic steel structure deviates from an original position, the Hall-effect detector 10 can transmit a Hall signal to the IC 9, and the IC 9 controls the magnitude and direction of electric energy supplied to the first coil 431 and the second coil 432 in the coil structure 43 to adjust a position of the lens holder 3.

Optionally, referring to FIG. 2, the lens driving device further includes magnet yokes 8 located on the two magnetic steel structures, and the magnet yokes 8 can transmit the magnetic field, so that more of the magnetic field moves in the direction of the coil structures 43.

Figure 17:
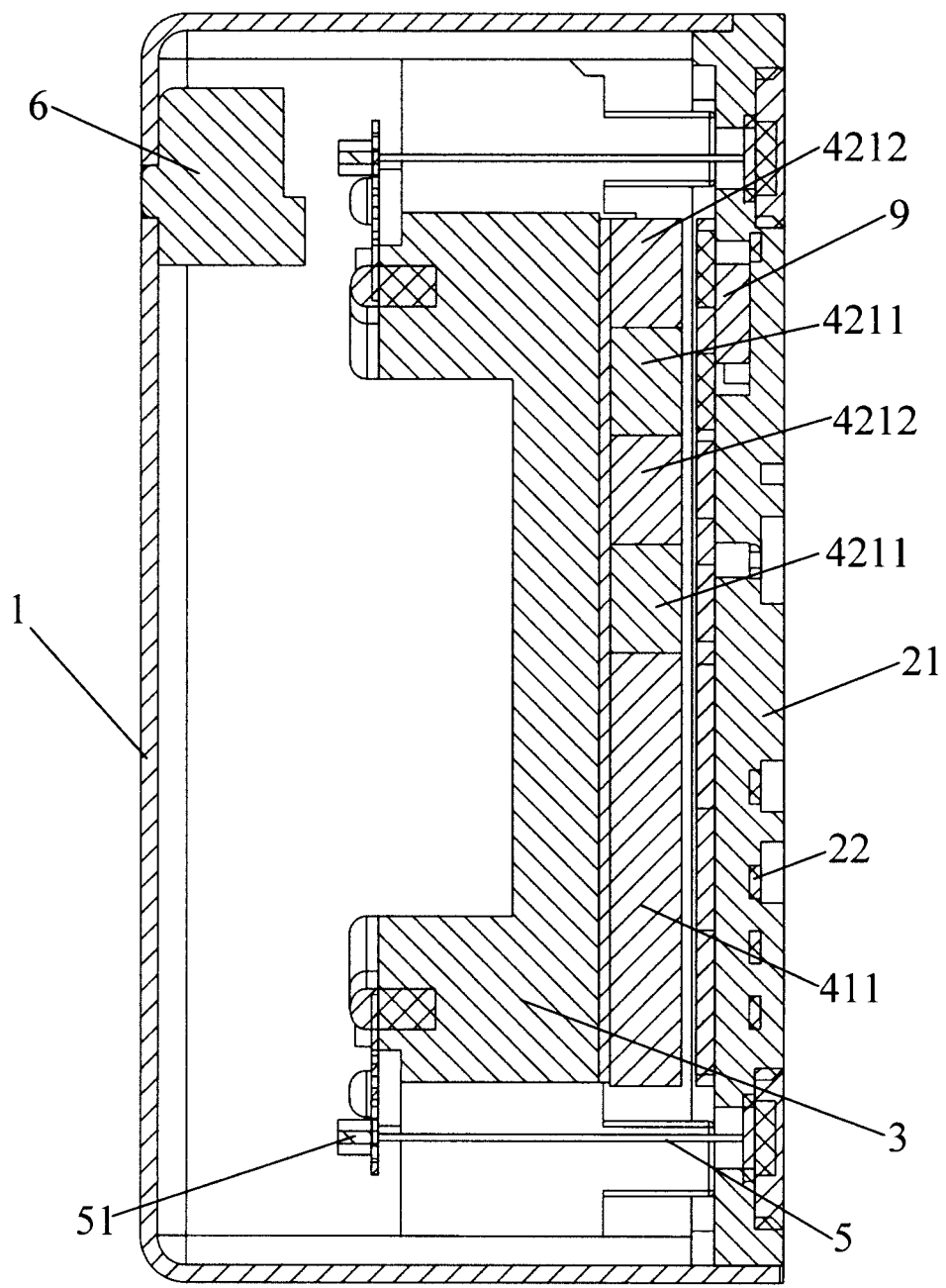
FIG. 17 is a cross-sectional view taken along a line B-B of the lens driving device shown in FIG. 16 according to the embodiment of the present disclosure.
Figure 18:
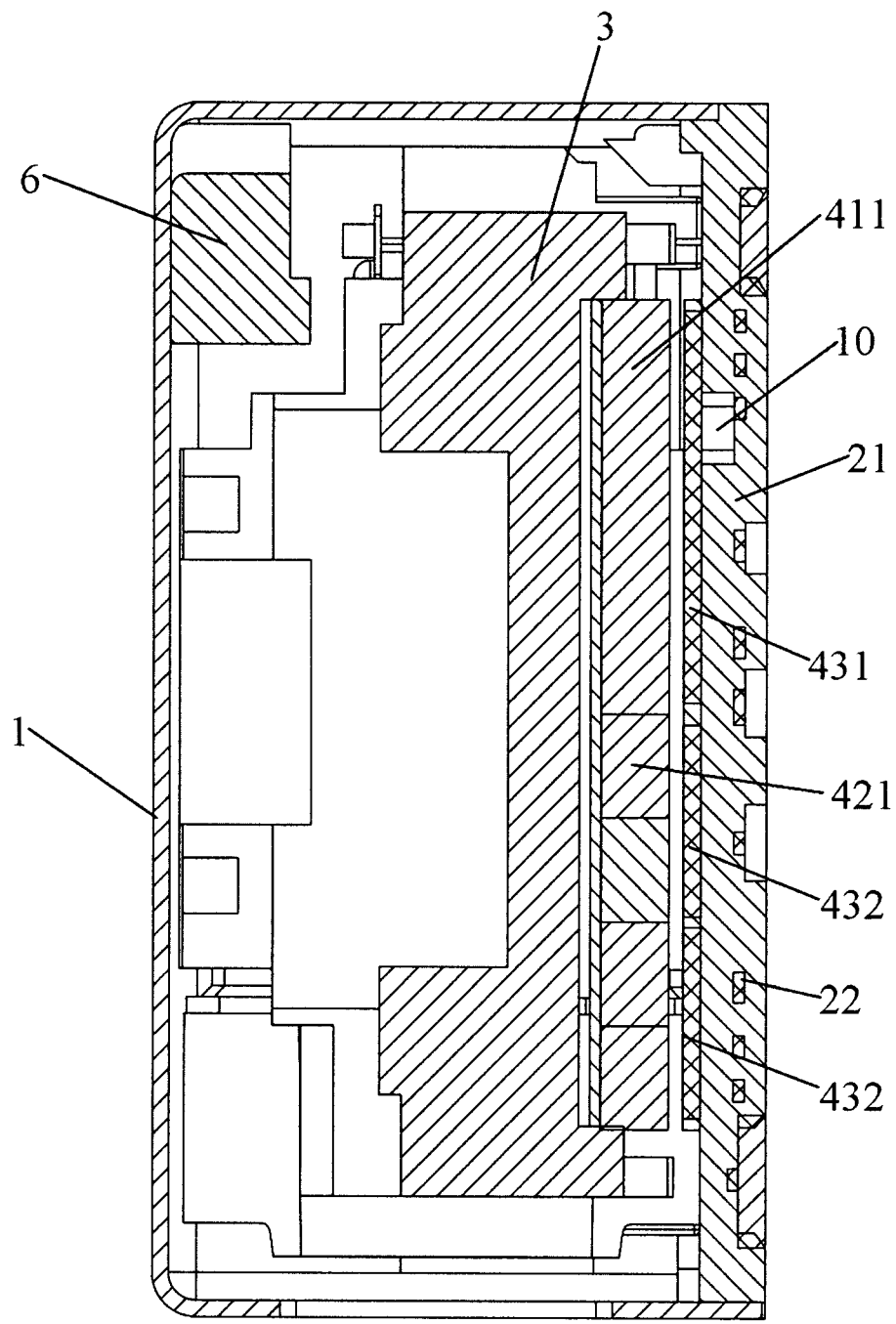
FIG. 18 is a cross-sectional view taken along a line C-C of the lens driving device shown in FIG. 16 according to the embodiment of the present disclosure.

Referring to FIG. 17, the lens driving device further includes four suspension wires 5 provided on the base assembly 2, and the suspension wires 5 may be electrically connected to the conductive terminals 22 in the base assembly 2. In a case where the electromagnetic driving assembly 4 is located on the upper side of the lens holder 3, the conductive terminals 22 can supply current to the coil structure 43 in the electromagnetic driving assembly 4 through the suspension wires 5 to ensure normal use of the electromagnetic driving assembly 4.

Optionally, the suspension wire 5 supports the lens holder 3 to be suspended in the accommodation space, and in a case where the electromagnetic driving assembly 4 is used for driving the lens holder to move along the horizontal direction, the suspension wire 5 is capable of assisting the electromagnetic driving assembly 4 to drive the lens holder 3 to move along the vertical direction.

Further, the lens driving device further includes metal springs 7 (shown in FIG. 2) electrically connected to top ends of the suspension wires 5, where an end of each spring 7 is fixedly connected to the lens holder 3, specifically fixed in the upper side of the lens holder, and the other end of the spring 7 engages with a top end of one suspension wire 5 in a snap-fit way. Specifically, the top end of the one suspension wire 5 is provided with a limit part 51 (shown in FIG. 17), the other end of the spring 7 is provided with a groove, which can cover a middle part of the each suspension wire 5, and a size of the groove is smaller than a size of the limit part 51. With the engagement of the springs 7 and the suspension wires 5, the lens holder 3 can only move between the limit parts 51 of the suspension wires 5 and the base assembly 2. In a case where the electromagnetic driving assembly 4 drives the lens holder 3 to move along the horizontal direction, the lens holder 3 drives the suspension wires 5 to move, so that the suspension wires 5 change from a vertical state to an inclined state, and since the length of the suspension wires 5 does not change, the position of the lens holder 3 in the vertical direction also changes during the process, so as to achieve adjustment of the lens holder 3 along the vertical direction.

Optionally, as shown in FIG. 2, the lens driving device may further include a support structure 6 fixed in the housing 1 for supporting the lens holder 3 to define a limit position of movement of the lens holder 3.

In the embodiment, the lens 100 may be a periscope lens, which can be applied to electronic devices such as a mobile phone and a computer.

The above embodiments describe only the basic principles and characteristics of the present disclosure and the present disclosure is not limited to the above embodiments. Various modifications and changes may be made in the present disclosure without departing from the spirit and scope of the present disclosure. These modifications and changes fall within the scope of the present disclosure. The scope of the present disclosure is defined by the appended claims and equivalents thereof.

What is claimed is:

1. A lens driving device, comprising:
a housing;
a base assembly, which forms an accommodation space with the housing;
a lens holder, which is suspended in the accommodation space;
four suspension wires, which connect to the base assembly and support the lens holder to be suspended in the accommodation space; and
two electromagnetic driving assemblies, which are arranged at an interval in a horizontal direction, are located at the same side of the lens holder and are configured to drive the lens holder to move along the horizontal direction, wherein each of the two electromagnetic driving assemblies comprises a magnet structure and a coil structure vertically opposite to the magnet structure, one of the magnet structure and the coil structure is disposed on the housing or the base assembly, and the other one of the magnet structure and the coil structure is disposed on the lens holder;
wherein in a case where the two electromagnetic driving assemblies drive the lens holder to move along the horizontal direction, the suspension wires are capable of assisting the two electromagnetic driving assemblies to drive the lens holder to move along a vertical direction;
wherein the magnet structure is composed of one first driving part and one second driving part sequentially arranged along a first direction, the first driving part is configured to drive the lens holder to move along a second direction, the second driving part is configured to drive the lens holder to move along the first direction, the first direction and the second direction are the horizontal direction, and the second direction is perpendicular to the first direction,
wherein the first driving part comprises a first driving unit, wherein the first driving unit comprises a first magnetic pole and a second magnetic pole sequentially arranged along the second direction, and a magnetic polarity of the first magnetic pole is opposite to a magnetic polarity of the second magnetic pole;
wherein the second driving part comprises a plurality of second driving units sequentially arranged along the first direction, wherein each of the plurality of second driving units comprises a third magnetic pole and a fourth magnetic pole sequentially arranged along the first direction, and a magnetic polarity of the third magnetic pole is opposite to a magnetic polarity of the fourth magnetic pole; and
wherein the first driving part and the second driving part of the magnet structure of one of the two electromagnetic driving assemblies are sequentially arranged from rear to front, and the first driving part and the second driving part of the magnet structure of the other one of the two electromagnetic driving assemblies are sequentially arranged from front to rear, wherein the first direction is a front-rear direction.

2. The lens driving device of claim 1, wherein the first driving part comprises a plurality of first driving units sequentially arranged along the second direction, wherein each of the plurality of first driving units comprises a first magnetic pole and a second magnetic pole sequentially arranged along the second direction, and a magnetic polarity of the first magnetic pole is opposite to a magnetic polarity of the second magnetic pole; and wherein in response to the plurality of first driving units, the coil structure comprises a plurality of first coils in one-to-one correspondence with the plurality of first driving units.

3. The lens driving device of claim 2, wherein
in response to the plurality of second driving units, the coil structure comprises a plurality of second coils in one-to-one correspondence with the plurality of second driving units.

4. The lens driving device of claim 3, wherein in a case where the second driving part comprises the one second driving unit, the third magnetic pole in the one second driving unit is disposed adjacent to the first driving part, and the third magnetic pole is an S pole.

5. The lens driving device of claim 4, wherein the first driving part and the second driving part are an integrated magnetizing structure.

6. The lens driving device of claim 3, wherein in a case where the second driving part comprises two second driving units, the coil structure comprises two second coils in one-to-one correspondence with the two second driving units; and
wherein
a third magnetic pole in one of the two second driving units is disposed adjacent to the first driving part and is an S pole; and a third magnetic pole in the other one of the two second driving units is disposed adjacent to a fourth magnetic pole in the one of the two second driving units and is an S pole; or
a third magnetic pole in one of the two second driving units is disposed adjacent to the first driving part and is an N pole; and a third magnetic pole in the other one of the two second driving units is disposed adjacent to a fourth magnetic pole in the one of the two second driving units and is an S pole.

7. The lens driving device of claim 3, wherein the first driving part and the second driving part are an integrated magnetizing structure.

8. The lens driving device of claim 2, wherein the first driving part and the second driving part are an integrated magnetizing structure.

9. The lens driving device of claim 1, wherein the first driving part and the second driving part are an integrated magnetizing structure.

10. The lens driving device of claim 1, further comprising: a spring, wherein the spring is fixedly connected to each of the suspension wires and the lens holder.

11. The lens driving device of claim 1, wherein a bottom side of the lens holder is provided with an accommodation groove, the electromagnetic driving assembly is located at the bottom side of the lens holder, and the magnet structure of the electromagnetic driving assembly is embedded in the accommodation groove.

12. The lens driving device of claim 1, wherein the first driving part and the second driving part are an integrated magnetizing structure.

13. The lens driving device of claim 1, wherein the base assembly includes a base and a plurality of conductive terminals, wherein the base and the plurality of conductive terminals are injection molded into an integrated structure, and the plurality of conductive terminals are electrically connected to the coil structure.

* * * * *